(12) United States Patent
Hu et al.

(10) Patent No.: US 7,824,510 B2
(45) Date of Patent: Nov. 2, 2010

(54) METHODS OF REPAIRING ENGINE COMPONENTS

(75) Inventors: Yiping Hu, Greer, SC (US); Timothy Hudson, Greenville, SC (US); Eric Reinholz, Greer, SC (US); Calum Macintyre, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 480 days.

(21) Appl. No.: 12/020,917

(22) Filed: Jan. 28, 2008

(65) Prior Publication Data

US 2009/0188590 A1    Jul. 30, 2009

(51) Int. Cl.
*B23K 31/00* (2006.01)
(52) U.S. Cl. ..................... 148/528; 148/675
(58) Field of Classification Search ............ None
See application file for complete search history.

(56) References Cited

U.S. PATENT DOCUMENTS

| | | | |
|---|---|---|---|
| 5,240,518 A | 8/1993 | Wortman et al. | |
| 6,454,885 B1 | 9/2002 | Chesnes et al. | |
| 6,503,349 B2 | 1/2003 | Pietruska et al. | |
| 6,968,991 B2 | 11/2005 | Renteria et al. | |
| 2005/0067069 A1 | 3/2005 | Humm et al. | |
| 2006/0163323 A1 | 7/2006 | Pietruska et al. | |

FOREIGN PATENT DOCUMENTS

EP    1783237 A2    5/2007

*Primary Examiner*—George Wyszomierski
*Assistant Examiner*—Yoshitoshi Takeuchi
(74) *Attorney, Agent, or Firm*—Ingrassia Fisher & Lorenz, P.C.

(57) ABSTRACT

Methods are provided for repairing an engine component. In an embodiment, a method includes forming at least one layer of a first braze alloy mixture including about 40% by weight of a first base alloy material and about 60% by weight of a first braze alloy material, over a structural feature of the component. The first braze alloy material includes chromium, cobalt, tungsten, tantalum, aluminum, hafnium, carbon, boron, and a balance of nickel. A second braze alloy mixture is disposed over the at least one layer of the first braze alloy mixture, the second braze alloy mixture including between about 50% and about 60% by weight of a second base alloy material, and between about 40% and about 50% by weight of a second braze alloy material. The component is then subjected to heat treatment, and may be further subjected to machining, coating and final inspection.

20 Claims, 1 Drawing Sheet

METHODS OF REPAIRING ENGINE COMPONENTS

TECHNICAL FIELD

The inventive subject matter generally relates to engine components, and more particularly relates to methods of repairing gas turbine engine components.

BACKGROUND

Turbine engines are used as the primary power source for various kinds of aircraft. The engines may also serve as auxiliary power sources that drive air compressors, hydraulic pumps, and industrial electrical power generators. Most turbine engines generally follow the same basic power generation procedure. Compressed air is mixed with fuel and burned, and the expanding hot combustion gases are directed against stationary turbine vanes in the engine. The vanes turn the high velocity gas flow partially sideways to impinge onto turbine blades mounted on a rotatable turbine disk. The force of the impinging gas causes the turbine disk to spin at high speed. Jet propulsion engines use the power created by the rotating turbine disk to draw more air into the engine, and the high velocity combustion gas is passed out of the gas turbine aft end to create forward thrust. Other engines use this power to turn one or more propellers, electrical generators, or other devices.

Because fuel efficiency increases as engine operating temperatures increase, turbine engine blades and vanes are typically fabricated from high-temperature materials such as nickel-based superalloys. However, although nickel-based superalloys have good high temperature properties and many other advantages, they may be susceptible to corrosion, oxidation, thermal fatigue, and foreign particle impact in the high temperature environment during turbine engine operation. In such cases, the turbine engine blades and vanes may need to be repaired, such as, by welding, by a diffusion brazing process or by a combination of both welding and diffusion brazing.

Diffusion brazing processes typically employ a braze alloy mixture that includes a base alloy material (also referred to as a "high-melt alloy") and a braze alloy material (also referred to as "a low-melt alloy"). The high-melt alloy is usually a material that is substantially similar in composition to the material of the component being repaired, while the low-melt alloy typically comprises a braze alloy powder including a relatively low volume fraction (e.g., less than 50%) of gamma prime and small amount of solid solution strengthening alloying elements and has a melting temperature that is lower than that of the high-melt alloy. After a slurry coating of the braze alloy mixture is applied to a repair area on the turbine component and subjected to heat treatment in a vacuum furnace, the mixture melts and heals cracks and builds up material loss on the repair area. Although the aforementioned processes are suitable for performing certain repairs, they may not be useful for others.

Hence, it is desirable to have an improved process for repairing turbine engine components such as the turbine engine nozzles and vane segments. It is also desirable for the repair process to be cost-effective. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Methods are provided for repairing engine components.

In an embodiment, and by way of example only, a method includes forming at least one layer of a first braze alloy mixture over a structural feature of the engine component. The first braze alloy mixture comprises about 40% by weight of a first base alloy material about 60% by weight of a first braze alloy material. The first braze alloy material comprises between about 6.7% and about 9.2% by weight chromium, between about 9.7% and about 10.3% by weight cobalt, between about 3.7% and about 4.7% by weight tungsten, between about 3.3% and about 6.3% by weight tantalum, between about 3.6% and about 5.2% by weight aluminum, between about 1.3% and about 4.0% by weight hafnium, between about 0.02% and about 0.06% by weight carbon, between about 1.0% and about 3.2% by weight boron, and a balance including nickel. A second braze alloy mixture is disposed over the at least one layer of the first braze alloy mixture, the second braze alloy mixture comprising between about 50% and about 60% by weight of a second base alloy material and between about 40% and about 50% by weight of a second braze alloy material. The component is subjected to a heat treatment to melt the first braze alloy mixture and the second braze alloy mixture and to flow at least a portion of the first braze alloy mixture into the structural feature.

In another embodiment, by way of example only, the method includes forming at least one layer of a first braze alloy mixture over a structural feature of the component, the first braze alloy mixture comprising about 40% by weight of a first base alloy material and about 60% by weight of a first braze alloy material. The first braze alloy material consists essentially of chromium at about 9.0% by weight, cobalt at about 10.0% by weight, tungsten at about 4.0% by weight, tantalum at about 3.5% by weight, aluminum at about 3.8% by weight, hafnium at about 1.5% by weight, carbon at about 0.04% by weight, boron at about 2.5% by weight, and a balance including nickel. A second braze alloy mixture is disposed over the at least one layer of the first braze alloy mixture, the second braze alloy mixture comprising about 50% by weight of a second base alloy material that is substantially identical in formulation to the first base alloy material, and about 50% by weight of a second braze alloy material that is substantially identical in formulation to the first braze alloy material. The component is subjected to a heat treatment to melt the first braze alloy mixture and the second braze alloy mixture and to flow at least a portion of the first braze alloy mixture into the structural feature.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
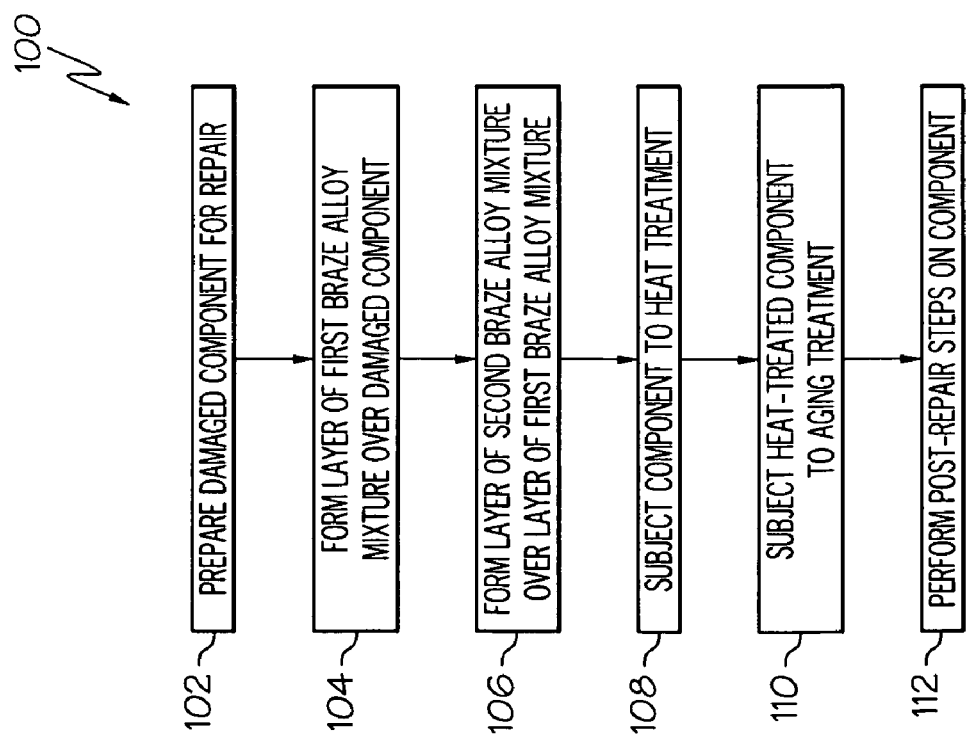
FIG. 1 is a flow diagram of a method of repairing an engine component, according to an embodiment.

Turning now to FIG. 1, a flow diagram of a method 100 of repairing an engine component is provided, according to an embodiment. The method 100 may be used to repair a variety of different turbine engine components, such as high pressure turbine (HPT) components including turbine vanes, nozzle guide vanes, other stationary vanes, turbine shrouds, or other components in a "hot" section of a turbine engine (e.g., in a section in which components are exposed to temperatures in excess of 850° C.) and are thus particularly susceptible to wear, oxidation erosion, and other degradation.

Figure 2:
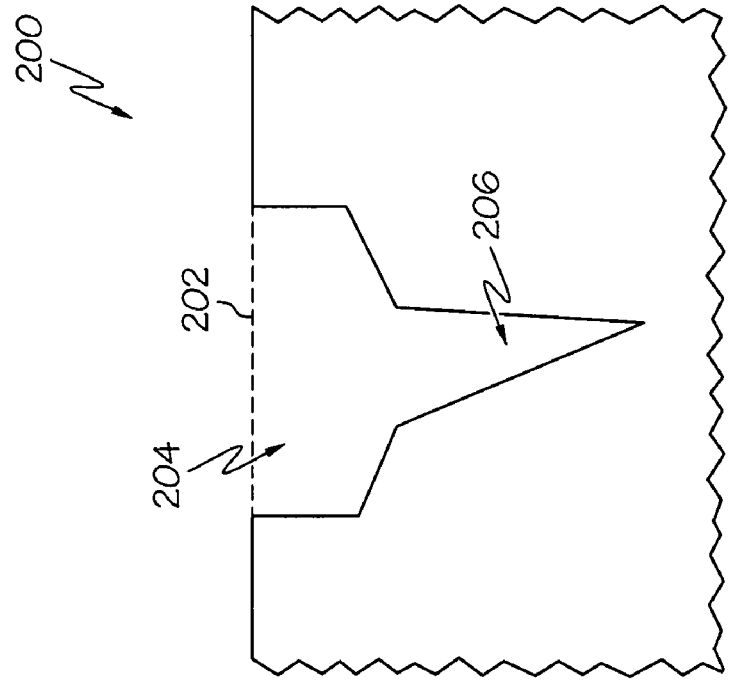
FIG. 2 is a simplified cross-sectional view of a portion of a component having a structural feature, according to an embodiment.

The method 100 may be particularly useful in healing cracks or repairing other types of structural features and restoring both geometry and/or dimension of the component to an original geometry and/or dimension. As used herein, the term "structural feature" means a physical feature of a component having a smooth or irregular-shaped surface contour that extends below an original or intended surface contour of the component. A structural feature may include a crack, a machined indentation, a divot, a hole or any other structural feature, and a structural feature may be a feature that was made intentionally or due to a projectile impact, corrosion, oxidation, thermal fatigue, and/or other types of wear experienced by the component. For example, FIG. 2 is a cross-sectional view of a portion of a component 200 having a structural feature. An original or intended surface contour 202 of the component 200 is shown in phantom. As depicted in FIG. 2, the structural feature of the component 200 includes a worn section 204 and a crack 206. The worn section 204 may be a removed portion of the component 200 and may have any dimensions. For example, the worn section 204 may have a depth of anywhere from 0.1 mm to 0.7 mm or in some cases the worn section 204 may be deeper or shallower. The crack 206 may have a depth of between about 0.1 mm and about 0.8 mm or in some cases, The crack 206 may be deeper or shallower. The crack 206 may also have a length of between about 0.01 cm and about 0.08 cm. In other cases, the crack 206 may be longer or shorter.

In any case, returning to FIG. 1, when it is desired to repair the structural feature, the component may first be prepared for repair, step 102. Then, one or more layers of a first braze alloy mixture are formed within the structural feature of the component, step 104. Next, one or more layers of a second braze alloy mixture are disposed over the first braze alloy mixture, step 106. The component, including the first and second braze alloy mixtures thereon, is subjected to a heat treatment, step 108. The heat-treated component may then be subjected to an aging treatment, step 110. Post-repair steps may be performed on the component, step 112. Each of the steps will now be discussed in detail.

As mentioned briefly above, the component may be prepared for repair, step 102. In an embodiment, step 102 may include chemically preparing the surface of the component at least in proximity to and/or on surfaces defining the structural feature. For example, in an embodiment in which the component includes an outer environment-protection coating, the coating may be removed. Thus, a chemical stripping solution may be applied to a surface of the component, such as the surfaces and portions of the component surrounding and/or defining the structural feature. Suitable chemicals used to strip the coating may include, for example, nitric acid solution. However, other chemicals may alternatively be used, depending on a particular composition of the coating. In another embodiment, the component may be mechanically prepared. Examples of mechanical preparation include, for example, pre-repair machining and/or degreasing surfaces in proximity to and/or defining the structural feature in order to remove any oxidation, dirt or other contaminants. In another embodiment, surface preparation may occur and may include a fluoride ion cleaning process to remove oxides from the surfaces of the component. The fluoride ion cleaning process may be followed with a high-temperature vacuum cleaning process to remove excess fluoride remainder that may be on the component. In other embodiments, additional or different types and numbers of preparatory steps can be performed.

Next, one or more layers of a first braze alloy mixture may be applied to surfaces in proximity to and/or defining the structural feature, step 104. In an embodiment, the first braze alloy mixture includes a base alloy material and a braze alloy material, and in some embodiments, a binder. The base alloy material, also known as a high-melt alloy, may be a material that is substantially similar in composition to a material from which the component is made, in an embodiment. In another embodiment, the base alloy material may be a material that has improved corrosion-resistance, oxidation-resistance, or other desired properties over the material of the component. Suitable base alloy materials include, but are not limited to IN738LC, C101, MarM247, INC713C, Rene 80, IN792 and the like. The acceptable concentrations of the elements that comprise the previously mentioned base alloy materials are presented in Table 1. In all of the various base alloy materials, the balance of the concentration is preferably nickel, though the balance could be nickel and one or more other elements that may be present in trace amounts.

|  | Alloy | | | | | | | | | | | |
| --- | --- | --- | --- | --- | --- | --- | --- | --- | --- | --- | --- | --- |
|  | Co | Cr | Mo | W | Ta | Al | Ti | C | B | Nb | Zr | other |
| IN738LC | 8.5 | 16.0 | 1.75 | 2.6 | 1.75 | 3.4 | 3.4 | .11 | .01 | .9 | .05 | — |
| C101 | 9.0 | 12.6 | 1.9 | 4.17 | 4.17 | 3.4 | 4.0 | .13 | .015 | .10 | .03 | .9Hf |
| Mar-M247 | 10.0 | 8.25 | .7 | 10.0 | 3.0 | 5.5 | 1.0 | .15 | .015 | — | .05 | 1.5Hf |
| IN713C | — | 12.5 | 4.2 | — | 1.75 | 6.0 | .80 | .12 | .012 | .90 | .10 | — |
| Rene 80 | 9.5 | 14.0 | 4.0 | 4.0 | — | 3.0 | 5.0 | .17 | .015 | — | .02 | — |
| IN792 | 9.0 | 12.4 | 1.9 | 3.8 | 3.9 | 3.1 | 4.5 | .12 | .02 | — | .10 | — |

The braze alloy material, also referred to as a "low-melt alloy" has a melting temperature that is lower than that of the base alloy material or "high-melt alloy," and is formulated to include gamma prime and solid solution strengthening alloying elements. In an embodiment, the braze alloy material is a nickel-based alloy broadly defined as comprising nickel, chromium, cobalt, tungsten, tantalum, aluminum, hafnium, carbon, and boron. The braze alloy material may additionally include rhenium. For example, the braze alloy material may comprise chromium ranging between about 6.7% and about 9.2% by weight, cobalt ranging between about 9.7% and about 10.3% by weight, tungsten ranging between about 3.7% and about 4.7% by weight, tantalum ranging between about 3.3% and about 6.3% by weight, aluminum ranging between about 3.6% and 5.2% by weight, hafnium ranging between about 1.3% and about 4.0% by weight, carbon ranging between about 0.02% and about 0.06% by weight, boron ranging between about 1.0% and about 3.2% by weight, and optionally, about 1.4% and about 3.2% rhenium by weight. In this embodiment and in other embodiments described below, the balance of the braze alloy material is nickel. Additionally, in this and in all of the various embodiments described below, one or more other elements may be present in trace amounts. As used herein, the term "about" may be defined as being within ±0.1% of a given value.

In another embodiment, the braze alloy material comprises chromium ranging between about 8.7% and about 9.2% by weight, cobalt ranging between about 9.7% and about 10.3% by weight, tungsten ranging between about 3.7% and about 4.2% by weight, tantalum ranging between about 3.3% and about 3.7% by weight, aluminum ranging between about 3.6% and about 4.0% by weight, hafnium ranging between about 1.3% and about 1.7% by weight, carbon ranging between about 0.02% and about 0.06% by weight, and boron ranging between about 2.3% and about 2.7% by weight. In still another embodiment, the braze alloy material may comprise chromium at about 9.0% by weight, cobalt at about 10.0% by weight, tungsten at about 4.0% by weight, tantalum at about 3.5% by weight, aluminum at about 3.8% by weight, hafnium at about 1.5% by weight, carbon at about 0.04% by weight, and boron at about 2.5% by weight.

In still another embodiment, the braze alloy material may comprise chromium ranging between about 6.7% and about 7.3% by weight, cobalt ranging between about 9.7% and about 10.3% by weight, tungsten ranging between about 3.7% and about 4.2% by weight, tantalum ranging between about 5.7% and about 6.3% by weight, aluminum ranging between about 4.8% and about 5.2% by weight, hafnium ranging between about 1.3% and about 1.7% by weight, carbon ranging between about 0.02% and about 0.06% by weight, and boron ranging between about 2.8% and about 3.2% and rhenium ranging between about 2.8% and about 3.2% by weight. In still another embodiment, chromium is included at about 7.0% by weight, cobalt is included at about 10.0% by weight, tungsten is included at about 4.0% by weight, tantalum is included at about 6.0% by weight, aluminum is included at about 5.0% by weight, hafnium is included at about 1.5% by weight, carbon is included at about 0.04% by weight, boron is included at about 3.0% by weight, and rhenium is included at about 3.0% by weight.

In still another embodiment, the braze alloy material includes chromium ranging between about 8.3% and about 8.8% by weight, cobalt ranging between about 9.7% and about 10.3% by weight, tungsten ranging between about 4.2% and about 4.7% by weight, tantalum ranging between about 3.7% and about 4.2% by weight, aluminum ranging between about 3.8% and about 4.2% by weight, hafnium ranging between about 3.3% and about 3.7% by weight, carbon ranging between about 0.02% and about 0.06% by weight, and boron ranging between about 1.0% and about 1.3% by weight. In still another embodiment, chromium is included at about 8.5% by weight, cobalt is included at about 10.0% by weight, tungsten is included at about 4.5% by weight, tantalum is included at about 4.0% by weight, aluminum is included at about 4.0% by weight, hafnium is included at about 3.5% by weight, carbon is included at about 0.04% by weight, and boron is included at about 1.15% by weight.

In still another embodiment, the braze alloy material includes chromium ranging between about 8.3% and about 8.8% by weight, cobalt ranging between about 9.7% and about 10.3% by weight, tungsten ranging between about 4.2% and about 4.7% by weight, tantalum ranging between about 3.7% and about 4.2% by weight, aluminum ranging between about 3.8% and about 4.2% by weight, hafnium ranging between about 3.3% and about 3.7% by weight, carbon ranging between about 0.02% and about 0.06% by weight, boron ranging between about 1.0% and about 1.3% by weight, and rhenium ranging between about 1.4% and about 1.8% by weight. In still another embodiment, chromium is included at about 8.5% by weight, cobalt is included at about 10.0% by weight, tungsten is included at about 4.5% by weight, tantalum is included at about 4.0% by weight, aluminum is included at about 4.0% by weight, hafnium is included at about 3.5% by weight, carbon is included at about 0.04% by weight, boron is included at about 1.15% by weight, and rhenium is included at about 1.6% by weight.

The first braze alloy mixture may be formulated to provide flow properties for repairing cracks and/or other structural features, and thus, may include about 40% by weight of the base alloy and about 60% by weight of the braze alloy material.

In an embodiment, the base alloy material and the braze alloy material may both be powders. In such case, the first braze alloy mixture may also include a binder. The binder may be a suspension medium that is incorporated to hold the base alloy material powder and the braze alloy material powder together and to allow the two to adhere to and diffuse into the surface of the component. For example, the binder may include toluene and acetone. Suitable binders may include, for example, AB215 (available through HiTec Metal Group, Inc. of Cincinnati, Ohio). The amount of binder included in the first braze alloy mixture depends on a desired consistency thereof. For example, in instances in which the first braze material is formed into a paste or a slurry, the powders may make up between about 85% to about 90% of the first braze alloy mixture and the binder may make up between about 10% to about 15% of the first braze alloy mixture.

As mentioned above, the first braze alloy mixture is then used to form one or more layers over surfaces in proximity to and/or defining the structural feature, step 104. In this regard, at least one layer of the first braze alloy mixture is applied to the surfaces to at least cover or partially fill in the structural feature. For example, in some cases, the first braze alloy mixture is applied to cover one or more surfaces defining a crack. In an embodiment, one or more layers (e.g., in a range of 1-3 layers) are applied to the surfaces. In other embodiments, more than two layers may be applied. The first braze alloy mixture may be applied using any one of numerous methods suitable for creating a layer on the component. In an embodiment, the first braze alloy mixture may be painted onto the component surfaces using a brush. In another embodiment, a syringe may be used for siphoning the first braze alloy mixture and depositing the first braze alloy mixture in various desired areas of the component. In still another embodiment, the first braze alloy mixture may be pushed into or used to fill the various areas of the component using a spatula. Each applied layer may have a thickness of between about 0.05 mm and about 0.13 mm, and a total thickness of the applied first braze alloy mixture may be between about 0.25 mm and about 0.38 mm. In other embodiments, the layers and the thickness of each of the layers and/or the total thickness of the applied first braze alloy mixture may be greater or less. In an embodiment, each layer of the first braze alloy mixture may be dried or allowed to cure before a subsequent layer is applied thereover.

A second braze alloy mixture may be formulated, and after the one or more layers of the first braze alloy mixture are formed, one or more layers of a second braze alloy mixture are disposed over the first braze alloy mixture, step 106. In an embodiment, the second braze alloy mixture may be formulated and may comprise one of the aforementioned base alloy materials and one of the aforementioned braze alloy materials. For example, the second braze alloy mixture may comprise between about 50% and about 60% by weight of the base alloy material and between about 50% and about 40% by weight of the braze alloy material. In one particular embodiment, the second braze alloy mixture may include about 50% by weight of the base alloy material and about 50% by weight of the braze alloy material.

The base alloy material and the braze alloy material included in the second braze alloy mixture may be substantially identical in formulation to those used in the first braze alloy mixture, in an embodiment. In another embodiment, the braze alloy material of the second braze alloy mixture may have a different formulation than that used in the first braze alloy mixture, while the base alloy material of the second braze alloy mixture may be substantially identical in formulation to that of the first braze alloy mixture. In still another embodiment, the braze alloy material of the second braze alloy mixture may be substantially identical in formulation to that of the first braze alloy mixture, while the base alloy material of the second braze alloy mixture may be different in formulation than that used in the first braze alloy mixture.

In any case, if the base alloy material and the braze alloy material are powders, the second braze alloy mixture may also include a binder. The binder may be a suspension medium that is incorporated to hold the base alloy material powder and the braze alloy material powder together and to allow the two to adhere to the surface of the damaged component. Suitable binders may include, for example, AB215 (available through HiTec Metal Group, Inc. of Cincinnati, Ohio). For example, the binder may include toluene and/or acetone. The amount of binder included in the second braze alloy mixture depends on a desired consistency thereof. For example, in instances in which the second braze alloy mixture is formed into a paste or a slurry, the powders may make up between about 85% to about 90% of the second braze alloy mixture and the binder may make up between about 10% to about 15% of the second braze alloy mixture.

One or more layers of the second braze alloy mixture may be disposed over the first braze alloy mixture. In an embodiment, the second braze alloy mixture may be applied onto the component using a brush. In another embodiment, a syringe may be used for siphoning the second braze alloy mixture and depositing the second braze alloy mixture in various desired areas of the component. In still another embodiment, the second braze alloy mixture may be pushed into a desired area of the component using a spatula. In an embodiment, multiple layers (e.g. in a range of between 3-7 layers) are applied to the component. In other embodiments, fewer or more layers may be applied. Each applied layer may have a thickness of between about 0.05 mm and about 0.15 mm, and a total thickness of the applied second braze alloy mixture may be between about 0.50 mm and about 0.9 mm. In other embodiments, the thickness of each of the layers and the total thickness of the applied second braze alloy mixture may be greater or less.

The component, including the first and second braze alloy mixtures thereon, is subjected to a heat treatment, step 108. In an embodiment, the component is placed in a vacuum furnace and exposed to a temperature that is sufficiently high to melt the first and second braze alloy mixtures, to at least draw a portion of the first braze alloy mixture (and in some cases, a portion of the second braze alloy mixture) into the crack or other structural feature via capillary attraction. In an example, the heat treatment may be a stepped cycle and may include exposure to various temperatures for various time durations. The stepped cycle may include the steps of heating the component to a temperature of between about 315° C. and about 320° C. and maintaining the temperature for about 30 minutes, increasing the temperature of the component to between about 535° C. and 540° C. and maintaining the temperature for about 30 minutes, increasing the temperature of the component to between about 980° C. and 985° C. and maintaining the temperature for about 30 minutes, increasing the temperature of the component to between about 1200° C. and 1205° C. and maintaining the temperature for about 30 minutes, and decreasing the temperature of the component to between about 1175° C. and 1180° C. and maintaining the temperature for about six hours. In an embodiment, the temperature may be increased each time at a rate of between about 10 and about 16° C./min, while the step of decreasing the temperature may be performed at a rate that is less, such as between about 15 and about 55° C./min. By heat treating the first and second braze alloy mixtures and component using the aforementioned stepped cycle, the braze alloy mixtures become molten and metallurgically bind onto the component allowing the boron in the braze alloy material to diffuse into the base alloy material and the component. In other embodiments, other stepped cycles may alternatively be employed, where different temperatures and time durations outside of the aforementioned ranges may be employed. Moreover, the number of steps in other stepped cycles may vary as well.

The heat-treated component may then be subjected to an aging treatment, step 110. In an embodiment, the aging treatment includes subjecting the heat-treated component to a temperature of between about 840° C. and 845° C. and maintaining the temperature for about four hours, and then decreasing the temperature of the component to between about 780° C. and 785° C. and maintaining the temperature for about sixteen hours. In other embodiments, other stepped cycles may alternatively be employed, where different temperatures and time durations outside of the aforementioned ranges may be employed. Moreover, the number of steps in other stepped cycles may vary as well.

Post-repair steps may be performed on the component, step 112. For example, post-repair steps may include processes that improve the component's mechanical properties, and metallurgical integrity. For example, the component may be machined to its originally designed dimension. Additionally, or alternatively, the component may undergo at least one inspection process to determine whether any surface defects, such as cracks, other openings, and/or other structural features exist. An inspection process can be conducted using any well-known non-destructive inspection techniques including, but not limited to, a fluorescent penetration inspection ("FPI inspection"), and a radiographic inspection. If the component passes inspection, it may undergo a re-coating process. In an embodiment, the re-coating process may use environment-resistant diffusion aluminide and/or MCrAlY overlay coatings, followed by coating diffusion, and aging heat treatments to homogenize microstructures in the overlay coatings and to improve coating performance Then, a final inspection may be performed on the component. If the repaired component passes the final inspection, it may be ready for use.

The above-described repair method may have advantages over conventional braze repair processes. In particular, by applying at least a layer of the above-described first braze alloy mixture to a structural feature, such as a crack, in a component, subsequently disposing a layer of the above-described second braze alloy mixture, and then subjecting the component to heat treatment, the component may be rebuilt to have properties that may be substantially similar or improved over those of the original component. During the heat treatment, because the above-described first braze alloy mixture may have improved flowability over other known braze alloy mixtures, the first braze alloy mixture may melt flow and diffuse into substantially all of the structural feature. Additionally, because the above-described second braze alloy mixture may have improved strength over other known braze alloy mixtures, the second braze alloy mixture may fill-in eroded portions of the component to thereby restore the structural integrity of the component to one that may be substantially identical to or better than the original component.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of repairing an engine component, the method comprising the steps of:
   forming at least one layer of a first braze alloy mixture over a structural feature of the component, the first braze alloy mixture comprising:
      about 40% by weight of a first base alloy material, and
      about 60% by weight of a first braze alloy material, the first braze alloy material comprising:
         between about 6.7% and about 9.2% by weight chromium;
         between about 9.7% and about 10.3% by weight cobalt;
         between about 3.7% and about 4.7% by weight tungsten;
         between about 3.3% and about 6.3% by weight tantalum;
         between about 3.6% and about 5.2% by weight aluminum;
         between about 1.3% and about 4.0% by weight hafnium;
         between about 0.02% and about 0.06% by weight carbon;
         between about 1.0% and about 3.2% by weight boron; and
         a balance including nickel,
   disposing a second braze alloy mixture over the at least one layer of the first braze alloy mixture, the second braze alloy mixture comprising:
      between about 50% and about 60% by weight of a second base alloy material, and
      between about 40% and about 50% by weight of a second braze alloy material; and
   subjecting the component to a heat treatment to melt the first braze alloy mixture and the second braze alloy mixture and to flow at least a portion of the first braze alloy mixture into the structural feature.

2. The method of claim 1, wherein the component comprises a component material and the first base alloy material is substantially identical in formulation to the component material.

3. The method of claim 1, wherein the first base alloy material is substantially identical in formulation to the second base alloy material.

4. The method of claim 1, wherein the first base alloy material is different in formulation from the second base alloy material.

5. The method of claim 1, wherein the first base alloy material comprises a material selected from the group consisting of INC738LC, C101, Mar-M247, IN713C, Rene 80, and IN792.

6. The method of claim 1, wherein the first braze alloy material is substantially identical in formulation to the second braze alloy material.

7. The method of claim 1, wherein the first braze alloy material is different in formulation than the second braze alloy material.

8. The method of claim 1, wherein the first braze alloy mixture further comprises a first binder, the second braze alloy mixture further comprises a second binder, and the first binder and the second binder are substantially identical in formulation.

9. The method of claim 1, wherein the first braze alloy material consists essentially of chromium at about 9.0% by weight, cobalt at about 10.0% by weight, tungsten at about 4.0% by weight, tantalum at about 3.5% by weight, aluminum at about 3.8% by weight, hafnium at about 1.5% by weight, carbon at about 0.04% by weight, and boron at about 2.5% by weight.

10. The method of claim 1, wherein the step of subjecting the component to a heat treatment comprises:
    heating the component to a first temperature of between about 315° C. and about 320° C. and maintaining the component at the first temperature for about 30 minutes;
    increasing the first temperature to a second temperature between about 535° C. and about 540° C. and maintaining the component at the second temperature for about 30 minutes;
    increasing the second temperature to a third temperature between about 980° C. and about 985° C. and maintaining the component at the third temperature for about 30 minutes;
    increasing the third temperature to a fourth temperature between about 1200° C. and about 1205° C. and maintaining the component at the fourth temperature for about 30 minutes; and
    decreasing the fourth temperature to a fifth temperature between about 1175° C. and about 1180° C. and maintaining the component at the fifth temperature for about six hours.

11. The method of claim 1, further comprising the step of exposing the heat-treated component to an aging treatment.

12. The method of claim 11, wherein the step of exposing comprises subjecting the heat-treated component to a first temperature of between about 840° C. and 845° C. and maintaining the component at the first temperature for about four hours, and decreasing the first temperature to a second temperature between about 780° C. and 785° C. and maintaining the component at the second temperature for about sixteen hours.

13. The method of claim 1, wherein the second braze alloy mixture comprises about 50% of the second base alloy material and about 50% of the second braze alloy material.

14. The method of claim 1, wherein the step of forming comprises forming the at least one layer of a first braze alloy mixture over a surface of a structural feature in a turbine shroud.

15. The method of claim 1, wherein the step of forming comprises forming the at least one layer of a first braze alloy mixture over a surface of a structural feature in a turbine vane.

16. A method of repairing an engine component, the method comprising the steps of:
   forming at least one layer of a first braze alloy mixture over a structural feature of the component, the first braze alloy mixture comprising:
      about 40% by weight of a first base alloy material, and
      about 60% by weight of a first braze alloy material, the first braze alloy material consisting essentially of:
         chromium at about 9.0% by weight,
         cobalt at about 10.0% by weight,
         tungsten at about 4.0% by weight,
         tantalum at about 3.5% by weight,
         aluminum at about 3.8% by weight,
         hafnium at about 1.5% by weight,
         carbon at about 0.04% by weight,
         boron at about 2.5% by weight, and
         a balance including nickel,
   disposing a second braze alloy mixture over the at least one layer of the first braze alloy mixture, the second braze alloy mixture comprising:
      about 50% by weight of a second base alloy material that is substantially identical in formulation to the first base alloy material, and
      about 50% by weight of a second braze alloy material that is substantially identical in formulation to the first braze alloy material; and
   subjecting the component to a heat treatment to melt the first braze alloy mixture and the second braze alloy mixture and to flow at least a portion of the first braze alloy mixture into the structural feature.

17. The method of claim 16, wherein the first base alloy material comprises a component material selected from a group consisting of INC738LC, C101, Mar-M247, IN713C, Rene 80, and IN792.

18. The method of claim 16, wherein the step of subjecting the component to a heat treatment comprises:
   heating the component to a first temperature of between about 315° C. and about 320° C. and maintaining the component at the first temperature for about 30 minutes;
   increasing the first temperature to a second temperature between about 535° C. and about 540° C. and maintaining the component at the second temperature for about 30 minutes;
   increasing the second temperature to a third temperature between about 980° C. and about 985° C. and maintaining the component at the third temperature for about 30 minutes;
   increasing the third temperature to a fourth temperature between about 1200° C. and about 1205° C. and maintaining the component at the fourth temperature for about 30 minutes; and
   decreasing the fourth temperature to a fifth temperature between about 1175° C. and about 1180° C. and maintaining the component at the fifth temperature for about six hours.

19. The method of claim 16, further comprising the step of exposing the heat-treated component to an aging treatment.

20. The method of claim 19, wherein the step of exposing comprises subjecting the heat-treated component to a first temperature of between about 840° C. and 845° C. and maintaining the component at the first temperature for about four hours, and decreasing the first temperature to a second temperature between about 780° C. and 785° C. and maintaining the component at the second temperature for about sixteen hours.

* * * * *